(12) United States Patent
Ciuperca

(10) Patent No.: US 12,151,975 B2
(45) Date of Patent: *Nov. 26, 2024

(54) MANUFACTURED NATURAL POZZOLAN FROM A CALCINED CLAY AND GROUND MINERAL, MANUFACTURED NATURAL POZZOLAN-BASED CEMENT AND METHOD OF MAKING AND USING SAME

(71) Applicant: Romeo Ilarian Ciuperca, Atlanta, GA (US)

(72) Inventor: Romeo Ilarian Ciuperca, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/466,199

(22) Filed: Sep. 13, 2023

(65) Prior Publication Data

US 2024/0002293 A1 Jan. 4, 2024

Related U.S. Application Data

(63) Continuation of application No. 17/573,570, filed on Jan. 11, 2022, now Pat. No. 11,787,742, which is a continuation of application No. 16/858,667, filed on Apr. 26, 2020, now Pat. No. 11,220,459, which is a continuation of application No. 16/208,764, filed on Dec. 4, 2018, now Pat. No. 10,633,287, which is a continuation of application No. 15/724,204, filed on Oct. 3, 2017, now Pat. No. 10,155,695.

(60) Provisional application No. 62/404,021, filed on Oct. 4, 2016.

(51) Int. Cl.
*C04B 28/04* (2006.01)
*C04B 14/10* (2006.01)
*C04B 14/14* (2006.01)
*C04B 18/14* (2006.01)
*C04B 20/10* (2006.01)
*C04B 40/00* (2006.01)
*C04B 111/00* (2006.01)

(52) U.S. Cl.
CPC ............. *C04B 28/04* (2013.01); *C04B 14/106* (2013.01); *C04B 14/14* (2013.01); *C04B 18/146* (2013.01); *C04B 20/1066* (2013.01); *C04B 20/1074* (2013.01); *C04B 40/0042* (2013.01); *C04B 2111/00215* (2013.01); *Y02W 30/91* (2015.05)

(58) Field of Classification Search
CPC ....... C04B 28/04; C04B 14/106; C04B 14/14; C04B 18/146; C04B 20/1066; C04B 20/1074; C04B 40/0042; C04B 2111/00215; Y02W 30/91
See application file for complete search history.

(56) References Cited

U.S. PATENT DOCUMENTS

| | | | |
|---|---|---|---|
| 10,633,287 B2 * | 4/2020 | Ciuperca | ............. C04B 40/0042 |
| 11,220,459 B2 * | 1/2022 | Ciuperca | ................. C04B 14/14 |
| 11,787,742 B2 * | 10/2023 | Ciuperca | ................. C04B 14/14 106/721 |

* cited by examiner

*Primary Examiner* — Anthony J Green
(74) *Attorney, Agent, or Firm* — Robert E. Richards

(57) ABSTRACT

The present invention comprises a product. The product comprises a first mineral in particulate form and having a first pozzolanic reactivity and a second mineral in particulate form and having a second pozzolanic reactivity greater than the first reactivity, wherein the surface of at least some of the particles of the first mineral is at least partially covered with particles of the second mineral. A method of making the composition of the present invention is also disclosed.

21 Claims, No Drawings

MANUFACTURED NATURAL POZZOLAN FROM A CALCINED CLAY AND GROUND MINERAL, MANUFACTURED NATURAL POZZOLAN-BASED CEMENT AND METHOD OF MAKING AND USING SAME

CROSS-REFERENCE TO RELATED APPLICATIONS

This application is a continuation of application Ser. No. 17/573,570 filed Jan. 11, 2022, now U.S. Pat. No. 11,787,742, which is a continuation of application Ser. No. 16/858,667 filed Apr. 26, 2020, now U.S. Pat. No. 11,220,459, which is a continuation of application Ser. No. 16/208,764 filed Dec. 4, 2018, now U.S. Pat. No. 10,633,287, which is a continuation of application Ser. No. 15/724,204 filed Oct. 3, 2017, now U.S. Pat. No. 10,155,695, which claims the benefit of application Ser. No. 62/404,021 filed Oct. 4, 2016.

FIELD OF THE INVENTION

The present invention generally relates to an improved manufactured natural pozzolan. More particularly, the present invention also relates to a cementitious material containing an improved manufactured natural pozzolan. The present invention further relates to concrete containing an improved manufactured natural pozzolan. The present invention also relates to a method of making an improved manufactured natural pozzolan-based cementitious material. The present invention further relates to a method of making concrete with a hydraulic cement and an improved manufactured natural pozzolan. The present invention further relates to a method a making concrete with portland cement and an improved manufactured natural pozzolan. The present invention also relates to a method of making concrete comprising a cementitious material based on an improved manufactured natural pozzolan. In addition, the present invention relates to a method of curing concrete comprising an improved manufactured natural pozzolan or an improved manufactured natural pozzolan-based cementitious material.

BACKGROUND OF THE INVENTION

Concrete dates back at least to Roman times. The invention of concrete allowed the Romans to construct building designs, such as arches, vaults and domes that would not have been possible without the use of concrete. Roman concrete, or opus caementicium, was made from a hydraulic mortar and aggregate or pumice. The hydraulic mortar was made from either quicklime, gypsum or pozzolana. Quick lime, also known as burnt lime, is calcium oxide; gypsum is calcium sulfate dihydrate and pozzolana is a fine, sandy volcanic ash (with properties that were first discovered in Pozzuoli, Italy). The concrete made with volcanic ash as the pozzolanic agent was slow to set and gain strength. Most likely the concrete was build up in multiple layers on forms that had to stay in place for a very long time. Although the concrete was slow to set and gain strength, over long periods of time it achieved great strength and was extremely durable. There are still Roman concrete structures standing today as a testimony to the quality of the concrete produced over 2000 years ago.

Modern concrete is composed of one or more hydraulic cements, coarse aggregates, and fine aggregates. Optionally, modern concrete can include other cementitious materials, inert fillers, property modifying admixtures and coloring agents. The hydraulic cement is typically portland cement. Other cementitious materials include Fly Ash, slag cement and other known natural pozzolanic materials. The term "pozzolan" is defined in ACI 116R as, " . . . a siliceous or siliceous and aluminous material, which in itself possesses little or no cementitious value but will, in finely divided form and in the presence of moisture, chemically react with calcium hydroxide at ordinary temperatures to form compounds possessing cementitious properties."

Portland cement is the most common hydraulic cement used around the world today. Portland cement is typically made from limestone. Concrete or mortar made with portland cement sets relatively quickly and gains relatively high compressive strength in a relatively short time. Although significant improvements have been made to the process and efficiency of portland cement manufacturing, it is still a relatively expensive and highly polluting industrial process.

Fly ash is a by-product of the combustion of pulverized coal in electric power generation plants. When the pulverized coal is ignited in a combustion chamber, the carbon and volatile materials are burned off. When mixed with lime and water, Fly Ash forms a compound similar to portland cement. Two classifications of Fly Ash are produced according to the type of coal from which the Fly Ash is derived. Class F Fly Ash is normally produced from burning anthracite or bituminous coal that meets applicable requirements. This class of Fly Ash has pozzolanic properties and will have minimum amounts of silica dioxide, aluminum oxide and iron oxide of 70%. Class F Fly Ash is generally used in hydraulic cement at dosage rates of 15% to 30% by weight, with the balance being portland cement. Class C Fly Ash is normally produced from lignite or subbituminous coal that meets applicable requirements. This class of Fly Ash, in addition to pozzolanic properties, also has some cementitious properties. Class C Fly Ash is used in hydraulic cement at dosage rates of 15% to 40% by weight, with the balance being portland cement.

Recently, the U.S. concrete industry has used an average of 15 million tons of Fly Ash at an average portland cement replacement ratio of approximately 16% by weight. Since Fly Ash is a by-product from the electric power generating industry, the variable properties of Fly Ash have always been a major concern to the end users in the concrete industry. Traditionally, wet scrubbers and flue gas desulfurization ("FGD") systems have been used to control power plant $SO_2$ and $SO_3$ emissions. The residue from such systems consists of a mixture of calcium sulfite, sulphate, and Fly Ash in water. In using sodium-based reagents to reduce harmful emissions from the flue gas, sodium sulfite and sulfate are formed. These solid reaction products are incorporated in a particle stream and collected with the Fly Ash in particulate control devices. There is the potential for the sodium-based reagent to react with other components of the gas phases and with ash particulates in the flue gas and in the particulate control device. All of the products of these reactions have the potential to impact the resulting Fly Ash. Anecdotal evidence has shown that the Fly Ash that contains sodium-based components has unpredictable and deleterious effect in concrete. Consequently, the concrete industry is at great risk of using a product that is unpredictable in its performance. Coupled with the closure of many coal-fired power plants, resulting in less availability of Fly Ash, the concrete industry is facing a dramatic shortage of a familiar pozzolan.

Known natural pozzolans can be used in concrete to replace the growing shortage of Fly Ash. However, known natural pozzolan deposits are limited and generally are far from construction markets. Natural pozzolans can be raw or processed. ASTM C-618 defined Class N natural pozzolans as, "Raw or calcined natural pozzolans that comply with the applicable requirements for the class as given herein, such as some diatomaceous earth; opaline chert and shales; tuffs and volcanic ashes or pumicites, any of which may or may not be processed by calcination; and various materials requiring calcination to induce satisfactory properties, such as some clays and shales."

Other known natural pozzolans include Santorin earth, Pozzolana, Trachyte, Rhenish trass, Gaize, volcanic tuffs, pumicites, diatomaceous earth, and opaline shales, rice husk ash and Metakaolin. Santorin earth is produced from a natural deposit of volcanic ash of dacitic composition on the island of Thera in the Agean Sea, also known as Santorin, which was formed about 1600-1500 B.C. after a tremendous explosive volcanic eruption (Marinatos 1972). Pozzolana is produced from a deposit of pumice ash or tuff comprised of trachyte found near Naples and Segni in Italy. Pozzolana is a product of an explosive volcanic eruption in 79 A.D. at Mount Vesuvius, which engulfed Herculaneum, Pompeii, and other towns along the bay of Naples. The deposit near Pozzuoli is the source of the term "pozzolan" given to all materials having similar properties. Similar tuffs of lower silica content have been used for centuries and are found in the vicinity of Rome. In the United States, volcanic tuffs and pumicites, diatomaceous earth, and opaline shales are found principally in Oklahoma, Nevada, Arizona, and California. Rice husk ash ("RHA") is produced from rice husks, which are the shells produced during the dehusking of rice. Rice husks are approximately 50% cellulose, 30% lignin, and 20% silica. Metakaolin ($Al_2O_3:2SiO_2$) is a natural pozzolan produced by heating kaolin-containing clays to a temperature of about 600 to 900° C. (1100 to 1650° F.) above which it recrystallizes, rendering it mullite ($Al_6Si_2O_{13}$) or spinel ($MgAl_2O_4$) and amorphous silica (Murat, Ambroise, and Pera 1985). The reactivity of Metakaolin is dependent upon the amount of kaolinite contained in the original clay material. The use of Metakaolin as a pozzolanic mineral admixture has been known for many years, but has grown rapidly since approximately 1985.

Natural pozzolans were investigated in this country by Bates, Phillips and Wig as early as 1908 (Bates, Phillips, and Wig 1912) and later by Price (1975), Meissner (1950), Mielenz, Witte, and Glantz (1950), Davis (1950), and others. They showed that concretes containing pozzolanic materials exhibited certain desirable properties such as lower cost, lower temperature rise, and improved workability. According to Price (1975), an example of the first large-scale use of portland-pozzolan cement, composed of equal parts of Portland cement and a rhyolitic pumicite, is the Los Angeles aqueduct in 1910-1912. Natural pozzolans by their very definition have high silica or alumina and silica content either in a raw or calcined form.

Generally Fly Ash has the advantage that it can reduce water demand of the cementitious matrix. This reduces plastic shrinkage and allows for better workability. Generally, known natural pozzolans and silica fume increase water demand in the cementitious matrix; in some cases, as high as 110%-115% that of portland cement. Greater water demand creates undesirable concrete properties such as lower strength development and greater plastic shrinkage. It is desired that pozzolans have a water demand that is lower than or equal to portland cement. However, this is an extremely rare occurrence for known natural pozzolans.

Due to the wide variety of natural pozzolanic types and quality found in generally relative small deposits and contaminated with other minerals makes it is difficult to provide consistent natural pozzolan materials on an industrial scale for a price comparable to the Fly Ash with similar and guaranteed performance required by the concrete industry. In addition, since most of these deposits are found in the western part of the U.S., the transportation cost makes them prohibitive to use in the rest of the country. Therefore, it would be desirable to have sources of natural pozzolan distributed throughout the country. It would also be desirable to have natural pozzolan having generally stable reactivity based on consistent chemical properties.

Aggregate quarries that mine construction aggregate are ubiquitous throughout the country. These aggregates chemical composition is primarily based on silicon dioxide and have the chemical component to react in a similar fashion as pozzolans. However these rock deposits are generally of crystalline type and are very slow to react even when ground to a sufficiently small particle size similar to other pozzolans or Fly Ash. While they may pass various sections of the ASTM C 618, overall they fail to meet other criteria. For example, these aggregates of a particle size sufficient to pass particle size criteria of a maximum of 34% of the amount retained when wet-sieved on a 45-μm (No. 325) sieve; they may pass the minimum requirement of 70% for total sum of silicon dioxide, iron oxide and aluminum oxide ($SiO_2+Al_2O_3+Fe_2O_3$), they may pass the requirement for the loss of ignition of a maximum of 10% and pass the requirement of water demand of a maximum of 115% and the autoclave expansion or contraction of a maximum of 0.8%. Yet, they typically fail the strength activity index based on the reactivity criteria of a minimum of 75% of control with portland cement, at 7 days, and the a minimum of 75% of control with portland cement, at 28 days. In addition, while some aggregates may pass all of the above ASTM D-618 criteria they are well below the reactivity of portland cement or Fly Ash and therefore are undesirable for use in the market place.

The crystalline aspect of these aggregates may be changed to amorphous through calcination. However, calcination adds cost to the product and makes such process relative expensive. It would be desirable to alter the crystalline aspect of the fine particle size aggregate-based material by adding an amorphous component so that the reactivity index increases to pass ASTM C-618 at 7 and 28 days. It would also be desirable to convert a low reactive material through a relatively inexpensive process to enhance its reactivity index performance so that it can meet or exceed the reactivity properties of Fly Ash or other known pozzolans.

SUMMARY OF THE INVENTION

The present invention satisfies the foregoing needs by providing a natural pozzolan that has improved properties and lower water demand than known fine ground crystalline aggregate materials could be used as natural pozzolans.

In one disclosed embodiment, the present invention comprises a product. The product comprises a first mineral in particulate form and having a first pozzolanic reactivity and a second mineral in particulate form and having a second pozzolanic reactivity greater than the first reactivity, wherein the surface of at least some of the particles of the first mineral is at least partially covered with particles of the second mineral.

In another disclosed embodiment, the present invention comprises a process. The process comprises combining a first mineral in particulate form and having a first pozzolanic reactivity with a second mineral in particulate form and having a second pozzolanic reactivity greater than the first reactivity, wherein the surface of at least some of the particles of the first mineral is at least partially covered with particles of the second mineral.

Accordingly, it is an object of the present invention to provide an improved concrete.

Another object of the present invention is to provide an improved cementitious material.

A further object of the present invention is to provide an improved supplementary cementitious material.

Another object of the present invention is to provide an improved natural pozzolan.

Another object of the present invention is to improve the reactivity of a relatively low pozzolanic reactivity fine ground aggregate material.

These and other objects, features and advantages of the present invention will become apparent after a review of the following detailed description of the disclosed embodiments and the appended claims.

DETAILED DESCRIPTION OF THE DISCLOSED EMBODIMENTS

In one disclosure embodiment, the improved manufactured natural pozzolan of the present invention is made of a first mineral having a first pozzolanic reactivity at least partially coated by a second mineral having a second pozzolanic reactivity higher than the first reactivity. The second mineral also has a smaller particle size than the first mineral.

The first mineral is a crystalline or amorphous mineral aggregate with a maximum of approximately 25% by weight glass or amorphous content, of approximately 5% to approximately 60% by weight Plagioclase Feldspar, 0% to approximately 40% by weight Clinopyroxene, 0% to approximately 30% by weight Amphibole, 0% to approximately 30% by weight other minerals with a minimum of 45% by weight silicon dioxide ($SiO_2$) content including, but not limited to, basalt, meta-basalt, intermediate, andesite or any other type of rock, is ground to a fine particle size that passes a 45 μm (No. 325) sieve, with a maximum of approximately 35% by volume retention. The particle size of the first mineral is approximately 15 to approximately 60 μm (volume-based average particle size) or a particle size measured by a specific surface area of approximately 50 to approximately 200 m²/kg. The first mineral has a pozzolanic reactivity index of less than 100% when tested in accordance with ASTM C-618 at 7 and 28 days. The first mineral chemical composition is preferably approximately 45% to approximately 60% $SiO_2$, approximately 5% to approximately 15% $Al_2O_3$, approximately 5% to approximately 20% $Fe_2O_3$, approximately 1% to approximately 20% CaO, approximately 0.5% to approximately 12% MgO, 0% to approximately 5% $N_2O$, 0% to approximately 3% $K_2O$ and approximately 1% to approximately 10% others compounds (all percentages are by weight unless otherwise noted).

The second mineral is an amorphous micro or nano silica, such as silica fume or any other type of nano or micro silica; or an aluminosilicate, such as Metakaolin, or any other type of calcined clay with a minimum of 75% by weight aluminosilicate ($Al_2O_3$:$2SiO_2$), or any other type material with a minimum of 75% by weight glass or amorphous content, 0% to approximately 20% Plagioclase Feldspar, 0% to approximately 10% K-Feldspar 0% to approximately 10% Clinopyroxene, 0% to approximately 10% Amphibole, 0% to approximately 20% Kaolinite, 0% to approximately 10% Olivine, 0% to approximately 10% other minerals and a chemical composition of approximately 50% to approximately 80% $SiO_2$, approximately 5% to approximately 45% $Al_2O_3$, approximately 5% to approximately 20% $Fe_2O_3$, approximately 1% to approximately 20% CaO, approximately 0.5% to approximately 12% MgO, 0% to approximately 5% $N_2O$, 0% to approximately 3% $K_2O$ and approximately 1% to approximately 10% other compounds (all percentages are by weight unless otherwise noted) and a volume-based average particle size of approximately 0.1 to approximately 10 μm or a specific area fineness of approximately 300 to approximately 10,000 m²/kg. The second mineral has a pozzolanic reactivity index of greater than 100% when tested in accordance to ASTM C618 at 7 and 28 days. The properties above include all intermediate values.

The second mineral is then deposited, fused, coated or otherwise disposed on to the surface of the first mineral. The proportion between the two minerals is of approximately 70% to approximately 95% of the first mineral and approximately 5% to approximately 30% of the second mineral when measured by weight or by volume. Various methods can be employed to deposit, fuse, coat or otherwise disposed the second mineral onto the surface of the first mineral, such as blending through air movement or electrostatic means. The particular method by which the coating of the first mineral by the second mineral is accomplished is not the subject of this inventions and can be any other means known in the industry that can achieve the coating of this first mineral by the second mineral, fused or deposited onto the surface area of the first mineral.

An alternative method of coating, depositing or otherwise disposing the second mineral onto the surface of the first mineral is by inter-grinding the second mineral with the first mineral. Yet another method of coating, depositing or otherwise disposing the second mineral onto the surface of the first mineral is to employ autogenous grinding whereby the two minerals of different particle size are aiding in the grinding process itself. Another alternative method of coating, depositing or otherwise disposing the second mineral onto the surface of the first mineral is by mixing the first mineral with an aluminosilicate clay under elevated temperatures in a rotating kiln or blending and calcining the two minerals together. Another alternative method of fusing the second mineral onto the surface of the first mineral is by blending the two materials under elevated temperatures in a rotating kiln or any other high temperature blending equipment.

The first mineral is slow to react on its own, however the second mineral has a higher pozzolanic reactivity. As such the pozzolanic reaction starts on the surface of the first mineral that is highly reactive due to the second mineral disposed thereon and then activating the first mineral that is less reactive. In other words, the manufactured pozzolan is activated by a two-stage pozzolanic reaction.

Preferably a water reducer admixture is added to the process above. The water reducing admixture will not affect the pozzolanic reaction, however it could improve the water demand based on various types of aggregate and minerals used. Such water reducing admixtures are solids or liquids. Water reducing admixtures are known in the industry and include, but are not limited to, lignin, naphthalene, carboxylates or polycarboxylates.

Preferred types of aggregates for the first mineral are igneous rocks. Igneous rock deposits are generally consistent in their chemical properties. Also, there are many different mining tailing deposits, both from closed and current mining operations, that meet the requirement of a minimum 70% by weight for the total sum of silicon dioxide, iron oxide and aluminum oxide ($SiO_2$+$Al_2O_3$+$Fe_2O_3$) and can be used as the first mineral.

The first mineral for use in the present invention can contain one or more of olivine, pyroxene, magnetite, quartz, hornblende, biotite, hypersthene, feldspathoids, plagioclase, calcite or other crystalline minerals or mixtures thereof.

Basalt is an aphanitic (fine-grained) igneous rock with generally 45% to 55% silica ($SiO_2$) containing essentially calcic plagioclase feldspar and pyroxene (usually Augite), with or without olivine. Basalts can also contain quartz, hornblende, biotite, hypersthene (an orthopyroxene) and feldspathoids. Basalts are often porphyritic and can contain mantle xenoliths. Basalt is distinguished from pyroxene andesite by its more calcic plagioclase. There are two main chemical subtypes of basalt: tholeiites which are silica saturated to oversaturated and alkali basalts that are silica undersaturated. Tholeiitic basalt dominate the upper layers of oceanic crust and oceanic islands, alkali basalts are common on oceanic islands and in continental magmatism. Basalts can occur as both shallow hypabyssal intrusions or as lava flows. The average density basalt is approximately 3.0 gm/$cm^3$.

Andesite is an abundant igneous (volcanic) rock of intermediate composition, with aphanitic to porphyritic texture. In a general sense, it is an intermediate type between basalt and dacite, and ranges from 57% to 63% by weight silicon dioxide ($SiO_2$). The mineral assemblage is typically dominated by plagioclase plus pyroxene or hornblende. Magnetite, zircon, apatite, ilmenite, biotite, and garnet are common accessory minerals. Alkali feldspar can be present in minor amounts.

In a disclosed embodiment, the present invention comprises an improved manufactured natural pozzolan (i.e., the combination of the first and second minerals) in powder form. The particle size of the powder is sufficiently small such that the improved manufactured natural pozzolan powder has pozzolanic properties. The improved manufactured natural pozzolan powder preferably having a volume average particle size (or a volume-based mean particle size) of less than or equal to 40 μm with a maximum 34% retained when passing through 325 mesh sieve, more preferably less than or equal to 20 μm with a maximum of 34% retained when passing through 325 mesh sieve, most preferably less than or equal to 15 μm with a maximum of 34% retained when passing through 325 mesh sieve, especially less than or equal to 10 μm with a maximum of 34% retained when passing through 325 mesh sieve, more especially less than or equal to 5 μm with a maximum of 34% retained when passing through 325 mesh sieve. The foregoing ranges include all of the intermediate values. To achieve the desired particle size, the improved manufactured natural pozzolan of the present invention can be ground using conventional means including, but not limited to, a ball mill, a roll mill or plate mill. A particle size classifier can be used in conjunction with the mill to achieve the desired particle size. Equipment for grinding and classifying the improved manufactured natural pozzolan to the desired particle size is commercially available from, for example, F. L. Smidth, Bethlehem, PA; Metso, Helsinki, Finland.

In one disclosed embodiment of the present invention, the improved manufactured natural pozzolan preferably has a chemical composition of approximately 45% to approximately 65% by weight $SiO_2$, approximately 5% to approximately 30% by weight $Al_2O_3$, approximately 5% to approximately 15% by weight $Fe_2O_3$, approximately 5% to approximately 15% by weight CaO, approximately 1% to approximately 15% by weight MgO, less than or equal to approximately 5% by weight $Na_2O$. In addition to the foregoing, other compounds can be present in minor amounts, such as $K_2O$, $TiO_2$, $P_2O_5$, MnO, various metals, rare earth trace elements and other unidentified elements. When combined, these other compounds represent less than 10% by weight of the total chemical composition of the improved manufactured natural pozzolan mineral.

In another disclosed embodiment, the improved manufactured natural pozzolan in accordance with the present invention preferably has a density or specific gravity of approximately 2.5 to approximately 3.1.

An improved manufactured natural pozzolan in accordance with the present invention is a combination of crystalline and amorphous (glassy) combination in varying proportions. Preferably, the improved manufactured natural pozzolan in accordance with the present invention preferably comprises approximately 0% to 99% by weight amorphous form, more preferably 10% to approximately 80% by weight amorphous form, most preferably approximately 20% to approximately 60% by weight amorphous form, especially approximately 30% to approximately 50% by weight amorphous form. The crystalline portion of the improved manufactured natural pozzolan preferably comprises approximately 3% to approximately 20% by weight olivine, approximately 5% to approximately 40% by weight clinopyroxene, approximately 5% to approximately 60% by weight plagioclase, and approximately 0% to approximately 10% (or less than 10%) by weight other minerals including, but not limited to, magnetite, UlvoSpinel, quartz, feldspar, pyrite, illite, hematite, chlorite, calcite, hornblende, biotite, hypersthene (an orthopyroxene), feldspathoids sulfides, metals, rare earth minerals, other unidentified minerals and combinations thereof. The foregoing ranges include all of the intermediate values.

The improved manufactured natural pozzolan in accordance with the present invention can be used as a supplementary cementitious material in concrete or mortar mixes. The improved manufactured natural pozzolan in accordance with the present invention is not by itself a hydraulic cement, but is activated by CaOH (hydrate lime) produced by the hydration of hydraulic cements, such as portland cement, or by other minerals or compounds having reactive hydroxyl groups, such as CaO (quick lime). In addition, the improved manufactured natural pozzolan in accordance with the present invention when mixed with cement may improve the cement nucleation process thereby improving the cement hydration process. The improved manufactured natural pozzolan in finer particles generally yields shorter set times and accelerated hydration in blended cements. Finer particle size of the improved manufactured natural pozzolan increases the rate of hydration heat development and early-age compressive strength in portland cement. This acceleration may be attributable to the improved manufactured natural pozzolan particle size (nucleation sites), its crystalline make-up and chemical composition. The improved manufactured natural pozzolan in accordance with the present invention can be used in combination with any hydraulic cement, such as portland cement. Other hydraulic cements include, but are not limited to, blast granulated slag cement, calcium aluminate cement, belite cement (dicalcium silicate), phosphate cements and others. Also, the improved manufactured natural pozzolan in accordance with the present invention by itself can be blended with lime to form a cementitious material. In one disclosed embodiment, blended cementitious material for cement or mortar preferably comprises from approximately 10% to approximately 90% by weight hydraulic cement and approximately 10% to approximately 90% by weight of the improved manufactured natural pozzolan in accordance with the present invention, more preferably approximately 20% to approximately 80% by weight hydraulic cement and approximately 20% to approximately 80% by weight of the improved manufactured natural pozzolan in accordance with the present invention, most preferably approximately 30% to approximately 70% by weight hydraulic cement and approximately 30% to approximately 70% by weight of the improved manufactured natural pozzolan in accordance with the present invention, especially approximately 40% to approximately 60% by weight hydraulic cement and approximately 40% to approximately 60% by weight of the improved manufactured natural pozzolan in accordance with the present invention, more especially approximately 50% by weight hydraulic cement and approximately 50% by weight of the improved manufactured natural pozzolan in accordance with the present invention. In another disclosed embodiment of the present invention, the cementitious material for concrete or mortar preferably comprises approximately 50% to approximately 90% by weight hydraulic cement and approximately 10% to approximately 50% by weight of the improved manufactured natural pozzolan in accordance with the present invention. The foregoing ranges include all of the intermediate values.

The present invention can be used with conventional concrete mixes. Specifically, a concrete mix in accordance with the present invention comprises cementitious material, aggregate and water sufficient to hydrate the cementitious material. The cementitious material comprises a hydraulic cement and the improved manufactured natural pozzolan in accordance with the present invention. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ (177 kg/m$^3$) of cement to 1,200 lbs/yd$^3$ (710 kg/m$^3$) of cement. In ultra-high performance concrete, the cementitious material exceeds the 40% by weight of the total weight of the concrete. The water-to-cement ratio by weight is usually approximately 0.25 to approximately 0.7. Relatively low water-to-cement materials ratios by weight lead to higher strength but lower workability, while relatively high water-to-cement materials ratios by weight lead to lower strength, but better workability. For high performance concrete and ultra-high performance concrete, lower water-to-cement ratios are used, such as approximately 0.15 to approximately 0.25. Aggregate usually comprises 70% to 80% by volume of the concrete. In ultra-high performance concrete the aggregate is less than 70% of the concrete by volume. However, the relative amounts of cementitious material to aggregate to water are not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more. In particular, ultra-high performance concrete, concrete panels or concrete elements with compressive strengths of over 20,000 psi can be cast and cured using the present invention.

The aggregate used in the concrete in accordance with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete in accordance with the present invention is not a critical aspect of the present invention, and, thus, any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement. The cementitious material preferably comprises a reduced amount of portland cement and an increased amount of supplementary cementitious materials; i.e., the improved manufactured natural pozzolan in accordance with the present invention. This results in cementitious material and concrete that is more environmentally friendly. The portland cement can also be replaced, in whole or in part, by one or more pozzolanic materials. Portland cement is a hydraulic cement. Hydraulic cements harden because of a hydration process; i.e., a chemical reaction between the anhydrous cement powder and water. Thus, hydraulic cements can harden underwater or when constantly exposed to wet weather. The chemical reaction results in hydrates that are substantially water-insoluble and so are quite durable in water. Hydraulic cement is a material that can set and harden submerged in water by forming insoluble products in a hydration reaction. Other hydraulic cements useful in the present invention include, but are not limited to, calcium aluminate cement, belite cement (dicalcium silicate), phosphate cements and anhydrous gypsum. However, the preferred hydraulic cement is portland cement.

In a disclosed embodiment of the present invention, concrete or mortar comprises a hydraulic cement, the improved manufactured natural pozzolan in accordance with the present invention, aggregate and water. Preferably, the cementitious material used to form the concrete or mortar comprises portland cement and the improved manufactured natural pozzolan powder, more preferably portland cement and the improved manufactured natural pozzolan having a volume average particle size (or volume-based mean particle size) of less than or equal to approximately 40 µm with a maximum of 34% retained when passing through 325 mesh sieve, most preferably portland cement and the improved manufactured natural pozzolan having a volume average particle size of less than or equal to approximately 20 µm with a maximum of 34% retained when passing through 325 mesh sieve, preferably less than or equal to 15 µm with a maximum of 34% retained when passing through 325 mesh sieve, preferably less than or equal to 10 µm with a maximum of 34% retained when passing through 325 mesh sieve, more preferably less than or equal to 5 µm with a maximum of 34% retained when passing through 325 mesh sieve. The foregoing ranges include all of the intermediate values.

In another disclosed embodiment of the present invention, concrete including an improved manufactured natural pozzolan in accordance with the present invention can include any other pozzolan in combination with hydraulic cement.

The portland cement and the improved manufactured natural pozzolan in accordance with the present invention can be combined physically or mechanically in any suitable manner and is not a critical feature of the present invention. For example, the portland cement and the improved manufactured natural pozzolan in accordance with the present invention can be mixed together to form a uniform blend of dry cementitious material prior to combining with the aggregate and water. Or, the portland cement and the improved manufactured natural pozzolan in accordance with the present invention can be added separately to a conventional concrete mixer, such as a transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the concrete in accordance with the present invention. Such chemical admixtures include, but are not limited to, accelerators, retarders, air entrainments, plasticizers, superplasticizers, coloring pigments, corrosion inhibitors, bonding agents and pumping aid.

Mineral admixtures can also be used with the concrete in accordance with the present invention. Although mineral admixtures can be used with the concrete of the present invention, it is believed that mineral admixtures are not necessary. However, in some embodiments it may be desirable to include a water reducing admixture, such as a superplasticizer.

Concrete can also be made from a combination of portland cement and pozzolanic material or from pozzolanic material alone. There are a number of pozzolans that historically have been used in concrete. A pozzolan is a siliceous or siliceous and aluminous material which, in itself, possesses little or no cementitious value but which will, in finely divided form and in the presence of water, react chemically with calcium hydroxide at ordinary temperatures to form compounds possessing cementitious properties (ASTM C618). The broad definition of a pozzolan imparts no bearing on the origin of the material, only on its capability of reacting with calcium hydroxide and water. The general definition of a pozzolan embraces a large number of materials, which vary widely in terms of origin, composition and properties The most commonly used pozzolans today are industrial by-products, such as slag cement (ground granulated blast furnace slag), Fly Ash, silica fume from silicon smelting, and natural pozzolans such as highly reactive Metakaolin, and burned organic matter residues rich in silica, such as rice husk ash.

The improved manufactured natural pozzolan in accordance with the present invention is a previously unknown natural pozzolan. It can be used as a substitute for any other pozzolan or in combination with any one or more pozzolans that are used in combination with any hydraulic cement used to make concrete or mortar.

It is specifically contemplated as a part of the present invention that concrete formulations including an improved manufactured natural pozzolan in accordance with the present invention can be used with concrete forms or systems that retain the heat of hydration to accelerate the curing of the concrete. Therefore, in another disclosed embodiment of the present invention, concrete in accordance with the present invention can be cured using concrete forms such as disclosed in U.S. Pat. Nos. 8,555,583; 8,756,890; 8,555,584; 8,532,815; 8,877,329; 9,458,637; 8,844,227; 9,074,379; 9,776,920; 10,065,339; 10,220,542 and 10,280,622 (the disclosures of which are all incorporated herein by reference.

The following examples are illustrative of selected embodiments of the present invention and are not intended to limit the scope of the invention. All percentages are by weight unless noted otherwise.

Example 1

The first mineral is a basalt-type aggregate with a chemical make-up of approximately 48% $SiO_2$, 13% $Al_2O_3$, 10% $Fe_2O_3$, 12% CaO, 10% MgO, 1.5% $N_2O$, 0.3% $K_2O$ and the balance being other compounds. The basalt-type aggregate has an amorphous content of approximately 15% of approximately 30% clinopyroxene, approximately 40% plagioclase feldspar, approximately 15% olivine and the balance being other minerals. The basalt-type aggregate is placed in a ball mill and ground to a volume-based average particle size of 30 microns. The second mineral is metakaolin with a chemical make-up of approximately 53% $SiO_2$, 40% $Al_2O_3$, 3% $Fe_2O_3$, 0.5% CaO, 0.5% MgO, 0.1% $N_2O$, 1% $K_2O$, and approximately 75% by weight amorphous content, of approximately 3% by weight K-feldspar, approximately 10% kaolinite and the balance being other minerals, with an average volume-based particle size of approximately 10 microns. The basalt-type aggregate particles and the Metakaolin particles are blended together with a proportion of 80% basalt-type aggregate particles and 20% Metakaolin. The resulting product has Metakaolin particles disposed on the surface of the basalt-type aggregate particles. The resulting improved manufactured pozzolan has improved properties in accordance with the present invention.

Example 2

The first mineral is a basalt-type aggregate with a chemical make-up of approximately 48% $SiO_2$, 13% $Al_2O_3$, 10% $Fe_2O_3$, 12% CaO, 10% MgO, 1.5% $N_2O$, 0.3% $K_2O$ and the balance being other compounds. The basalt-type aggregate has no amorphous content of approximately 35% clinopyroxene, approximately 50% plagioclase feldspar, approximately 15% olivine and the balance being other minerals. The basalt-type aggregate is placed in a ball mill and ground to a volume-based average particle size of 20 microns. The second mineral is silica fume with a chemical make-up of approximately 98% $SiO_2$ and the balance being other elements and having a volume-based average particle size of 1 micron. The basalt-type aggregate particles and the silica fume particles are blended together with a proportion of 85% basalt-type aggregate particles and 15% silica fume particles. The resulting product has silica fume particles disposed on the surface of the basalt-type aggregate particles. The resulting improved manufactured pozzolan has improved properties in accordance with the present invention.

Example 3

The first mineral is a basalt-type aggregate with a chemical make-up of approximately 55% $SiO_2$, 15% $Al_2O_3$, 8% $Fe_2O_3$, 9% CaO, 4% MgO, 3% $N_2O$, 0.9% $K_2O$ and the balance being other compounds. The basalt-type aggregate has no amorphous content of approximately 18% clinopyroxene, approximately 5% K-feldspar, approximately 10% Clino-amphibole and the balance being other minerals. The basalt-type aggregate is placed in a ball mill and ground to a volume-based average particle size of 30 microns. The second mineral is metakaolin with a chemical make-up of approximately 53% $SiO_2$, 40% $Al_2O_3$, 3% $Fe_2O_3$, 0.5% CaO, 0.5% MgO, 0.1% $N_2O$, 1% $K_2O$, and approximately 75% by weight amorphous content, of approximately 3% by weight K-feldspar, approximately 10% kaolinite and the balance being other minerals, with an average volume-based particle size of approximately 10 microns. The basalt-type aggregate particles and the Metakaolin particles are blended together with a proportion of 70% basalt-type aggregate particles and 30% Metakaolin. The resulting product has Metakaolin particles disposed on the surface of the basalt-type aggregate particles. The resulting improved manufactured pozzolan has improved properties in accordance with the present invention.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A composition comprising:
   a natural pozzolan comprising approximately 45% to approximately 65% by weight $SiO_2$ and approximately 5% to approximately 30% by weight $Al_2O_3$, wherein the natural pozzolan comprises the combination of a first and second mineral;
   wherein the first mineral is a crystalline or amorphous mineral aggregate comprising:
      less than or equal to 25% by weight glass or amorphous content;
      approximately 5% to approximately 60% by weight Plagioclase Feldspar;
      a minimum of 45% by weight $SiO_2$;
      wherein the first mineral is in particulate form having a volume-based mean particle size of approximately 15 to approximately 60 μm; and
      wherein the first mineral has a first pozzolanic reactivity; and
   wherein the second mineral comprises an aluminosilicate comprising:
      a minimum of approximately 75% by weight aluminosilicate;
      wherein the second mineral is in particulate form having a volume-based mean particle size of approximately 0.1 to approximately 10 μm; and
      wherein the second mineral has a second pozzolanic reactivity greater than the first pozzolanic reactivity.

2. The composition of claim 1, wherein the first mineral has a pozzolanic reactivity of less than 100% as measured by ASTM C-618.

3. The composition of claim 1, wherein the second mineral has a pozzolanic reactivity of greater than 100% as measured by ASTM C-618.

4. The composition of claim 1, wherein the second mineral is a calcined aluminosilicate clay.

5. The composition of claim 1, wherein the natural pozzolan has a volume-based mean particle size of less than or equal to approximately 20 μm.

6. The composition of claim 1, wherein the natural pozzolan has a volume-based mean particle size of less than or equal to approximately 15 μm.

7. The composition of claim 1, wherein the natural pozzolan has a volume-based mean particle size of less than or equal to approximately 10 μm.

8. The composition of claim 1 further comprising a hydraulic cement.

9. A composition comprising:
   a hydraulic cement;
   a first mineral, wherein the first mineral is a crystalline or amorphous mineral aggregate comprising:
      less than or equal to 25% by weight glass or amorphous content;
      approximately 5% to approximately 60% by weight Plagioclase Feldspar;
      a minimum of 45% by weight $SiO_2$;
      wherein the first mineral is in particulate form having a volume-based mean particle size of approximately 15 to approximately 60 μm; and
      wherein the first mineral has a first pozzolanic reactivity; and
   a second mineral comprising an aluminosilicate comprising a minimum of approximately 75% by weight aluminosilicate;
      wherein the second mineral is in particulate form having a volume-based mean particle size of approximately 0.1 to approximately 10 μm; and
      wherein the second mineral has a second pozzolanic reactivity greater than the first pozzolanic reactivity.

10. The composition of claim 9, wherein the hydraulic cement comprises portland cement.

11. The composition of claim 10, wherein the first mineral has a reactivity of less than 100% as measured by ASTM C-618.

12. The composition of claim 11, wherein the second mineral has a reactivity of greater than 100% as measured by ASTM C-618.

13. The composition of claim 12, wherein the second mineral is a calcined aluminosilicate clay.

14. The composition of claim 12, wherein the second mineral is Metakaolin.

15. A composition comprising:
   a hydraulic cement;
   a first mineral aggregate in crystalline or amorphous form comprising:
      less than or equal to 25% by weight glass or amorphous content;
      approximately 5% to approximately 60% by weight Plagioclase Feldspar;
      a minimum of 45% by weight $SiO_2$;
      wherein the first mineral is in particulate form having a volume-based mean particle size of approximately 15 to approximately 60 μm; and
      wherein the first mineral has a first pozzolanic reactivity; and
   a second mineral comprises an aluminosilicate comprising:
      a minimum of approximately 75% by weight aluminosilicate;
      wherein the second mineral is in particulate form having a volume-based mean particle size of approximately 0.1 to approximately 10 μm; and
      wherein the second mineral has a second pozzolanic reactivity greater than the first pozzolanic reactivity.

16. The composition of claim 15, wherein the hydraulic cement is portland cement.

17. The composition of claim 15, wherein the first mineral has a reactivity of less than 100% as measured by ASTM C-618.

18. The composition of claim 15, wherein the second mineral has a reactivity of greater than 100% as measured by ASTM C-618.

19. The composition of claim 15 further comprising combining the hydraulic cement, the first mineral and the second mineral with aggregate.

20. The composition of claim 15, wherein the second mineral is a calcined aluminosilicate clay.

21. The composition of claim 15, wherein the second mineral is Metakaolin.

* * * * *